United States Patent
de la Tousche et al.

(10) Patent No.: US 8,135,399 B2
(45) Date of Patent: Mar. 13, 2012

(54) METHOD FOR DETERMINING AN IDENTIFIER CORRESPONDING TO A FREQUENCY SET ON A DISPLAY UNIT OF THE COCKPIT AND SYSTEM OF IMPLEMENTATION

(75) Inventors: Francois de la Tousche, Toulouse (FR); Christine Veron, La Salvetat Saint-Gilles (FR); Julia Ulloa-Sanzo, Colomiers (FR); Jerome Goyet, Blagnac (FR)

(73) Assignee: Airbus France, Toulouse (FR)

( * ) Notice: Subject to any disclaimer, the term of this patent is extended or adjusted under 35 U.S.C. 154(b) by 720 days.

(21) Appl. No.: 12/108,631

(22) Filed: Apr. 24, 2008

(65) Prior Publication Data
US 2009/0005034 A1    Jan. 1, 2009

(30) Foreign Application Priority Data
Apr. 26, 2007 (FR) .................................... 07 54728

(51) Int. Cl.
*H04W 4/00* (2009.01)

(52) U.S. Cl. ............... 455/431; 455/456.1; 455/566
(58) Field of Classification Search .............. None
See application file for complete search history.

(56) References Cited

U.S. PATENT DOCUMENTS

| | | |
|---|---|---|
| 2002/0009993 A1 | 1/2002 | Dastrup |
| 2002/0009994 A1 | 1/2002 | Sample |
| 2003/0052800 A1 | 3/2003 | Snodgrass |
| 2006/0217851 A1 | 9/2006 | McGuffin |

*Primary Examiner* — Erika Gary
(74) *Attorney, Agent, or Firm* — Perman & Green, LLP

(57) ABSTRACT

A method for the determining, on board an aircraft, of an identifier of a communications center with which an aircraft crew wishes to enter into contact, includes the following operations: a) the writing, by the crew, of a radio-communications frequency to a display unit of the cockpit of the aircraft, b) the determining of surroundings of the aircraft, c) the determining of the communications centers situated in these surroundings, d) the comparing of the frequencies of these communications centers with the frequency displayed on the display unit of the cockpit, and f) when the frequency of a communications center is identical to the displayed frequency, the display on the aircraft display unit of the identifier of said communications center having a frequency identical to the displayed frequency.

10 Claims, 2 Drawing Sheets

METHOD FOR DETERMINING AN IDENTIFIER CORRESPONDING TO A FREQUENCY SET ON A DISPLAY UNIT OF THE COCKPIT AND SYSTEM OF IMPLEMENTATION

This application claims priority to and the benefit of French Application No. 07 54728 filed on 26 Apr. 2007, which is incorporated by reference in its entirety.

BACKGROUND

1. Field

The disclosed embodiments relate to a method for the determining, on board an aircraft, of an identifier of the communications centre with which the crew of the aircraft wishes to make contact. It enables the automatic recording of the identifier of the communications centre corresponding to the radio communications frequency entered in the cockpit display with a view, especially, to facilitating a resumption of communications. The disclosed embodiments also relate to a system used to implement this method.

The disclosed embodiments can be applied in aeronautics and especially in communications between an aircraft and the exterior.

2. Brief Description of Related Developments

Whether on the ground or in flight, an aircraft has to communicate through a radio link with the exterior, for example with the control tower or with an air-traffic control centre, in order to exchange data relating especially to the movement of the aircraft. In particular, when an aircraft is in flight, the crew on board the aircraft, for example the pilot or the co-pilot, communicates by radio link with the ground staff, for example the air-traffic controller, in order to exchange flight data.

This data may be data on the flight sector, the flight level, the speed of the aircraft, the frequency of transmission/reception of messages to be exchanged with the ground staff, etc. This data may, for example, relate to the VHF or HF frequency of the radio-frequency communications link with the communications centre, especially the ATC frequency in the case of communications for a civilian aircraft, or any other frequency intended for aeronautical use.

Indeed, each area of aeronautical space, such as airports and airspace, is sectorized. Each sector is managed by a communications centre. The term "communication centre" refers to an air-traffic control centre as well as to a communications centre for communications with the airline etc. For example, each sector of airspace is managed by one air-traffic control centre. In a given sector of airspace, therefore, an aircraft has only one air-traffic controller interacting with it. In this sector, the aircraft communicates with the communications centre on a specific HF or VHF frequency channel.

When an aircraft is to leave a sector in order to enter new sector, the crew of the aircraft must know the frequency of the radio channel on which it will communicate with the air-traffic controller of the new sector. The crew of the aircraft must be informed of the radio-frequency of the new sector before leaving the former sector so that it can come into contact with the air-traffic controller of the new sector as soon as it enters this new sector.

For example, when an aircraft reaches the end of a first sector, the air-traffic controller of the first sector sends the crew member in charge of communications on board the aircraft, hereinafter called the pilot, the new VHF or HF frequency on which the pilot will be communicating with the air-traffic controller of the second sector. Generally, the pilot writes this new frequency to a display unit of the cockpit, for example on a radio-frequency instruments control panel. When the pilot receives information on the frequency of the new sector, he knows which sector is concerned. Indeed, using regulations-specified documents such as maps, the pilot generally knows which communications centers he will be communicating with throughout the flight, depending on the maneuvers that he would have to make (for example landing, take-off, cruising etc). In any case, the frequency of the new communications centre is communicated to the pilot by the previous communications centre so that he can prepare to use the frequency that he will have to use for contacting the new control centre, by writing the information to a display unit of the cockpit.

Usually, it is only the frequency of the communications centre that is written to the display unit of the cockpit. The identifier, for example a name or an identification number, of this communication centre, is not written to the display unit. Consequently, only the pilot who has written the new frequency knows which communications centre is concerned. However, if another crew member has to take over the communication link, because the pilot is having health problems or for any other reason, then the person who takes over the communication will not know which communications centre he has linked up with.

To enable a resumption of the communication by another crew member, the pilot in charge of communications can write the identifier of the communications centre manually to the display unit or on a piece of paper. This manual method is not only painstaking for the pilot but also risky because, many tasks have to be performed when changing air sectors and this handwritten recording makes for an additional workload.

To resolve this problem of absence of knowledge of the identifier of the communications centre during a resumption of communications, it has been envisaged to make an automatic search for the identifier of the communications centre corresponding to the communications frequency used. Now, given the large number of sectors of aeronautical space, no communications centre has a unique communications frequency. Indeed, several control centers may be assigned the same frequency by the air-traffic control authorities, if these centers are distant enough for there to be no problem of interference between aircraft communicating with these different communications centers. There is therefore no objective relationship between the frequency of a communications centre and the identifier of the corresponding communications centre.

SUMMARY

The disclosed embodiments are aimed precisely at overcoming the drawbacks of the above-mentioned techniques. To this end, the disclosed embodiments propose a method for the automatic determining of the identifier of a communications centre with which an aircraft crew wishes to enter into contact and for the automatic display, on the cockpit display unit, of this identifier of the communications centre. To this end, the method of the disclosed embodiments searches for the communications centre situated in the geographical surroundings of the aircraft. It compares the frequencies of these centers with the frequency displayed on the display unit of the cockpit and then it displays the identifier of the communications centre whose frequency corresponds to the frequency written to on the display unit.

More specifically, the disclosed embodiments relate to a method for the determining, on board an aircraft, of an identifier of a communications centre with which an aircraft crew wishes to enter into contact, characterized in that it comprises the following operations:

the writing, by the crew, of a radiocommunications frequency to a display unit of the cockpit of the aircraft, the determining of surroundings of the aircraft, the determining of the communications centers situated in these surroundings, the comparing of the frequencies of these communications centers with the frequency displayed on the display unit of the cockpit, and when the frequency of a communications centre is identical to the displayed frequency, the display on the aircraft display unit of the identifier of said communications centre having a frequency identical to the displayed frequency.

The method of the disclosed embodiments may comprise one or more of the following characteristics:

the step b) for determining the surroundings of the aircraft comprises a determining of the geographical position of the aircraft and/or a determining of the altitude of the aircraft;

the determining of the geographical position of the aircraft comprises a determining of a perimeter C of transmission/reception of communications around the aircraft;

the determining of the geographical position of the aircraft consists of a search for the position of the aircraft relative to boundaries of the sectors of the airspace;

the step c) for determining communications centers consists of a search for the terrains situated in the determined transmission/reception perimeter around the aircraft;

the step c) for determining communications centers consists of a search for the sector of the airspace in which the aircraft is located and/or the sectors of the airspace close to the position of the aircraft;

the step c) for determining the communications centers consists of a search for the sectors of the airspace whose boundaries intersect the transmission/reception perimeter determined around the aircraft;

the determining of the communications centers comprises simultaneously a search for the terrains situated in the transmission/reception perimeter determined around the aircraft and a search for the sectors of the airspace in which the aircraft and/or sectors of the airspace close to the position of the aircraft are located;

the perimeter of transmission/reception of communications around the aircraft is determined as a function of the speed of the aircraft, its direction of flight and/or its altitude;

the steps a) to e) are reiterated whenever a new radiocommunications frequency is written to the display unit;

the steps a) to e) are reiterated at regular intervals.

The disclosed embodiments also relate to a system to implement the above-described method. More specifically, the disclosed embodiments relate to a system on board an aircraft used to determine an identifier of a communications centre with which an aircraft crew must enter into contact, characterized in that the system comprises:

a display unit to which a radio-communications frequency is written;

a database comprising at least one list of the communications centers, their transmission/reception frequencies and their identifier;

a computer capable of determining a surroundings of the aircraft and of comparing the transmission/reception frequencies of the communications centers with the frequency displayed on the display unit.

The disclosed embodiments also relate to an aircraft comprising means to implement the above-described method.

DETAILED DESCRIPTION

The disclosed embodiments propose a method for the automatic determining of the identifier of the communications centre corresponding to the frequency written by the pilot to the display unit of the cockpit. The identifier of the communications centre can also be displayed automatically on the display unit of the cockpit, for example beside the radio-communications frequency.

Here below in the description, the disclosed embodiments shall be described in the case where the surroundings of the aircraft comprise the airspace, the communications centre then being an air-traffic control centre communicating with the aircraft on an air-traffic control frequency. It will be understood that the same method can be applied to any radio-communications frequency dedicated to aeronautics and enabling communications between an aircraft and a communications centre.

Figure 1:
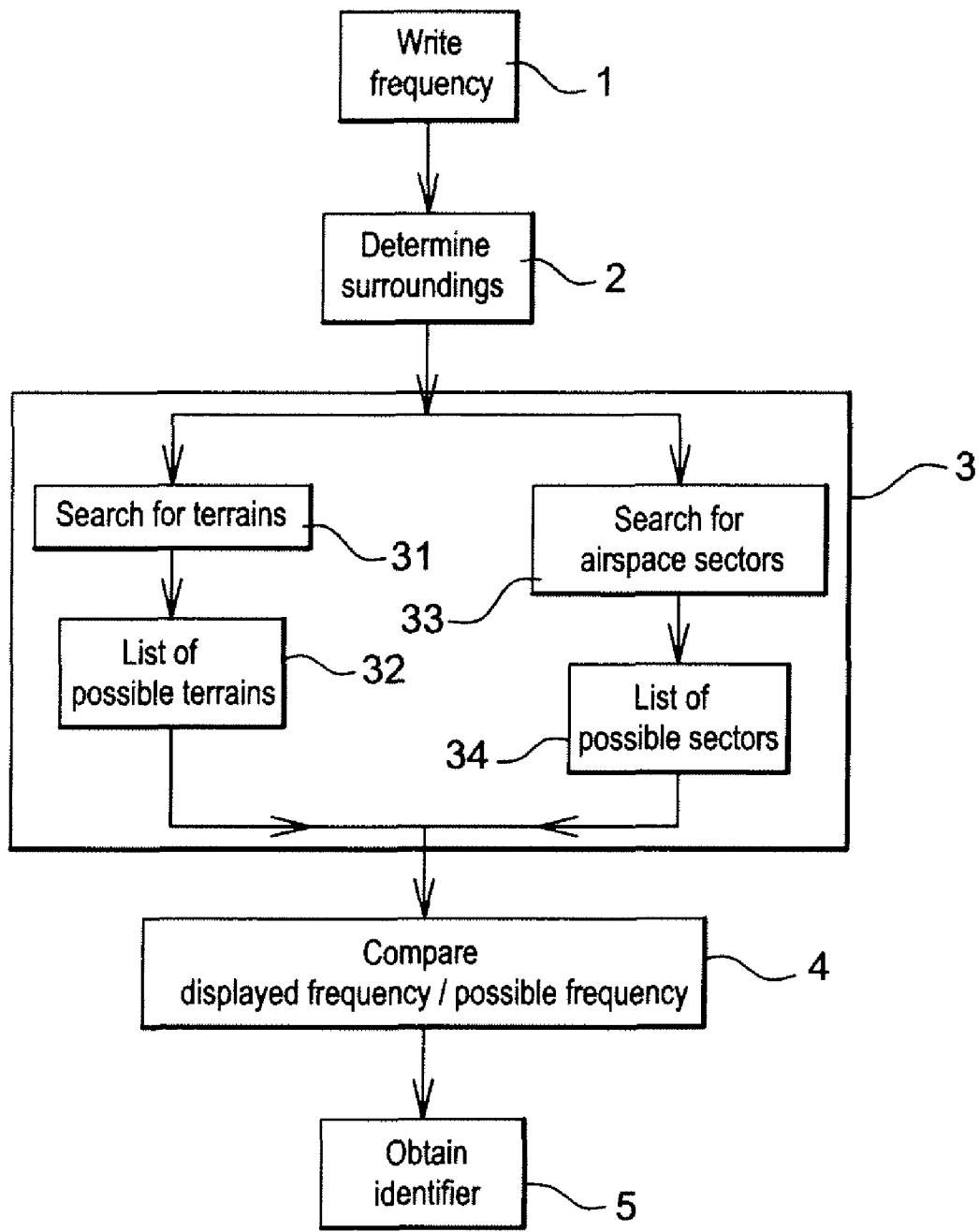
FIG. 1 is a functional diagram of the method of the disclosed embodiments.

A functional diagram of the method of the disclosed embodiments is shown in FIG. 1. This method comprises a first step 1 for entering the frequency of the air-traffic control centre. This frequency, here below called a displayed frequency, is then written to the display unit of the aircraft. The method then comprises a step 2 for determining the surroundings of the aircraft. The surroundings of the aircraft correspond to the geographical situation of the aircraft in space, i.e. its geographical position and its altitude.

The method of the disclosed embodiments searches for the air-traffic control frequencies that are available in the surroundings of the aircraft. Indeed, depending on its situation in space, the aircraft can communicate on several frequencies with one or more communications centers. The disclosed embodiments therefore propose (step 3) to determine which air-traffic control frequencies are possible for the aircraft, in its surroundings, and thus find the air-traffic control centers that are liable to communicate with the aircraft on these possible frequencies.

When the list of the aircraft control centers with their respective frequencies, has been drawn up, then in a step 4, the possible frequencies of the centers are compared with the displayed frequency. When a possible frequency is determined as being identical with the displayed frequency, then the air-traffic control centre that is communicating on this possible frequency is deemed to be the centre sought.

When the identifier is determined (step 5), it is displayed on the display unit of the cockpit of the aircraft.

To determine the possible frequencies, i.e. to sort out those frequencies that are possible from among all the frequencies of the surroundings of the aircraft, several sorting criteria can be used depending on the position of the aircraft. To sort out these possible frequencies, the method of the disclosed embodiments considers three types of frequencies to be possible:

- the frequencies directly related to a terrain: the terrains, which are for example airports, each have one or more dedicated and local frequencies. The frequencies may, for example, be a control tower frequency or a ground frequency covering the ground and the space close to the ground to communicate with aircraft that are taking off or landing.
- the frequencies associated with an airspace attached to a terrain: these frequencies are, for example, the approach frequencies used especially for communications with aircraft that are approaching an airport.
- the frequencies associated with an airspace not attached to a terrain: these frequencies are the control frequencies en route, i.e. the frequencies used to communicate with the aircraft in flight, at cruising altitude.

The possible frequencies, and hence the communications centers, are determined as a function of these different types of frequencies. To determine the possible frequencies related to these terrains, only the geographical coordinates of the terrains are considered to determine whether the frequency of a terrain is within range of the aircraft or not. To determine the possible frequencies associated with airspaces, whether or not related to a terrain, the method considers the horizontal and vertical limits of the airspaces, i.e. the boundaries of these airspaces, to find out whether or not the aircraft can communicate with the frequency of these airspaces.

In a first embodiment of the disclosed embodiments, the sorting out of the possible frequencies is done in defining a perimeter of transmission and reception of communications around the aircraft. In other words, a perimeter, i.e. a sort of virtual circle, is defined beyond which the aircraft cannot communicate (step 31). The frequencies chosen as possible frequencies are then the frequencies of the terrains situated within this perimeter (step 32).

Figure 2:
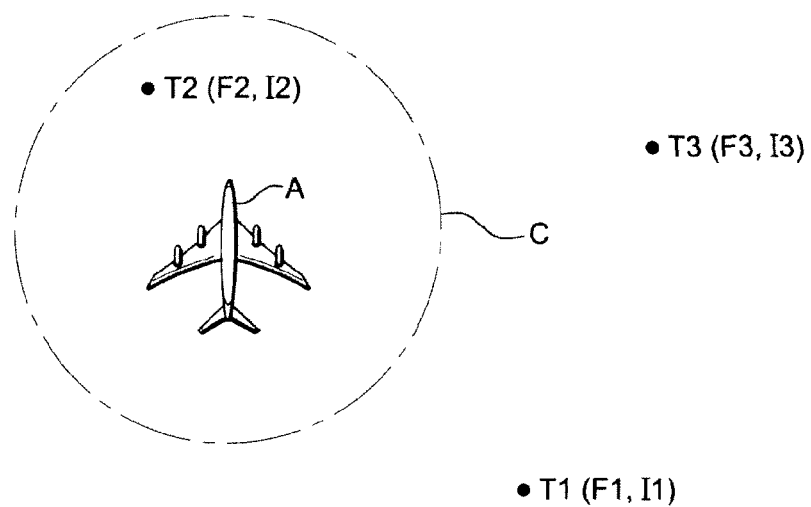
FIG. 2 is a schematic view of a first mode of determining communications centers situated in the surroundings of the aircraft.

FIG. 2 shows an example of a search for possible frequencies in the case of frequencies linked to a terrain. To this end, a perimeter is defined around the aircraft A. This perimeter is schematically represented by a circle C. This perimeter may be defined by a distance about the aircraft A. It can also be determined in taking account of different parameters, such as:

- the speed of the aircraft: for a more distant search, especially if the aircraft is flying at high speed;
- the direction of the aircraft: to limit the search to the terrains to which the aircraft is moving and not the terrains that are downstream from the path of the aircraft;
- the altitude: to search for terrains solely when the aircraft is not cruising.

In this embodiment, once the perimeter about the aircraft has been defined, a search is made for the different terrains situated within the perimeter. In the example of FIG. 2, the terrain T1, having the frequency F1 and the identifier I1, is outside the perimeter C. Similarly, the terrain T3, having a frequency F3 and an identifier I3, is outside the circle C. The terrains T1 and T3 therefore do not have a possible frequency that could correspond to the frequency displayed. On the other hand, in the example of FIG. 2, the terrain T2, with its frequency F2 and its identifier I2, is situated within the circle C. It therefore forms part of the possible terrains having a possible frequency.

In applying this example of FIG. 2 to the diagram of FIG. 1 we would have, at the step 32, in the list of possible terrains, the terrain T2. The frequency F2 of this terrain T2 would then be compared with the displayed frequency, in the step 4.

Figure 3:
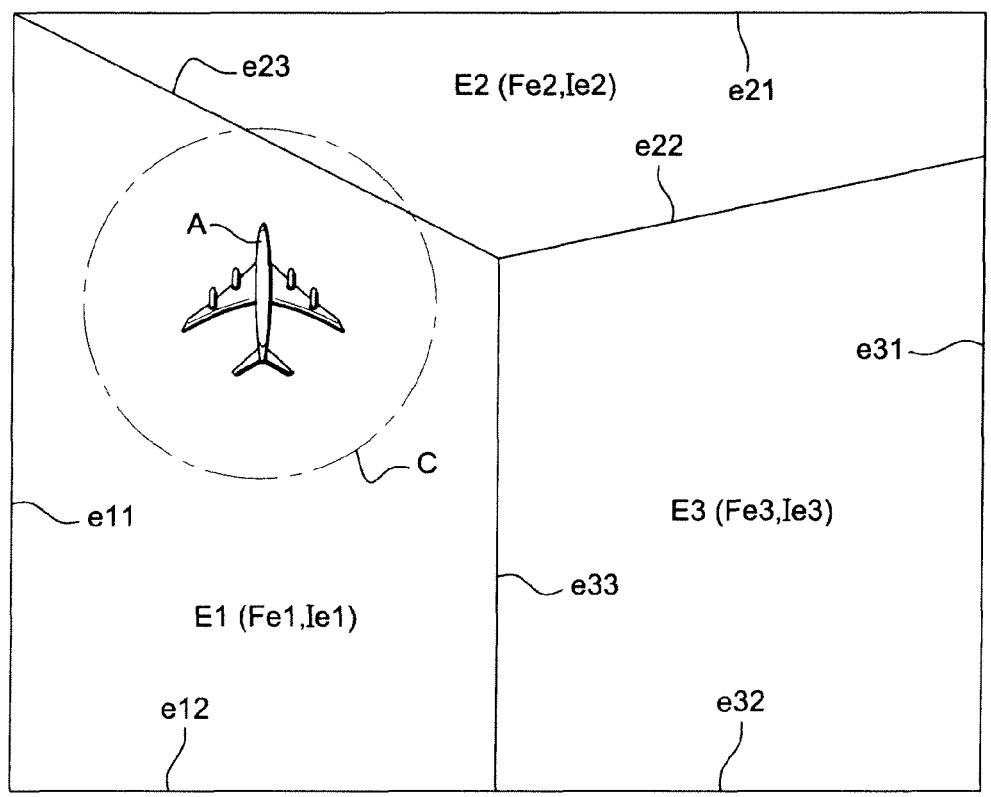
FIG. 3 is a schematic view of a second mode of determining communications centers situated in the surroundings of the aircraft.

In a second embodiment of the disclosed embodiments, the sorting of the possible frequencies is done in considering both the geographical position of the aircraft and its altitude. To this end, the position of the aircraft is defined relative to boundaries of the air sectors. FIG. 3 shows an example of a search for possible frequencies in the case of frequencies related to airspaces. This search is made in looking at the position of the aircraft A in space, relative to the boundaries of the different sectors of the airspace. To make the disclosed embodiments easier to understand, the boundaries of the air sectors of FIG. 3 have been represented in the form of straight lines. It understood that, in reality, the boundaries of the airspaces are not necessarily straight lines.

In the example of FIG. 3, the sector E2 has three boundaries e21, e22, e23, the sector E1 has four boundaries e11, e12, e33, e23 and the sector E3 has four boundaries e31, e32, e33, e22. The aircraft A is in the sector E1 and is moving to towards the sector E2. The possible frequencies are then considered to be those of the air sector in which the aircraft is situated (E1 in the example of FIG. 3), i.e. the air sector toward which the aircraft (E2 in the example of FIG. 3) is moving. The frequencies Fe1 of the sector E1 and Fe2 of the sector E2 are therefore possible frequencies.

Applying this example of FIG. 3 to the diagram of FIG. 1, we would have, in the step 33, in the list of possible sectors, the sectors E1 and E2. The frequencies Fe1 and Fe2 would then be compared with the displayed frequency, in the step 4.

It will therefore be understood that the first branch of the algorithm of FIG. 1 (i.e. the steps 31 and 32) can be used to search for possible communications centers in using the first embodiment described here above, and the second branch of the algorithm (i.e. the steps 33 and 34) can be used to search for possible centers in using the second embodiment. Each of these branches can be used to obtain a list of the possible communications centers. During a same search operation, a single branch can give a list of possible centers, or both branches can do so. The frequencies of all the possible centers are then compared with the displayed frequency, but only one possible frequency can be equal to the frequency displayed. When this possible frequency has been determined, the identifier of the communications centre having this possible frequency is displayed.

In one variant of this embodiment, a check is made to determine whether an air sector has a possible frequency in combining the geographical position of the aircraft and sectorwise distribution of the airspace. In other words, it is possible to define a perimeter around the aircraft, as in the first embodiment, and then study the position of the boundaries of the sectors of the airspace relative to this perimeter. In this variant, the sectors considered to be possible sectors of the airspace are those sectors in which one of the boundaries intersects the perimeter C of the aircraft. In other words, the sectors taken to be possible sectors of the airspace are those whose frequencies intersect a circle around the position of the aircraft. The perimeter C around the aircraft can be defined with the same parameters as those chosen to define the perimeter of the first embodiment. It is understood that the perimeter defined in this variant can also be defined on the basis of parameters different from those of the first embodiment.

Another variant of the disclosed embodiments uses the flight plan of the aircraft to refine the search for the identifier. Indeed, using the flight plan of the aircraft, it is possible to have approximate knowledge of the position of the aircraft, thus simplifying the search for the sectors of the airspace.

As explained here above, the method of the disclosed embodiments takes account of different types of communications frequencies, especially the frequencies directly related to a terrain, and the frequencies associated with an airspace not attached to a terrain. However, it is not possible to have a priori knowledge of the type of frequency displayed. Indeed, the type of frequency differs several times in the course of a same flight. The pilot successively enters the frequencies whose type varies as a function of the maneuvers and flight conditions of the aircraft. Thus, to take account of these different types of frequencies, the method of the disclosed embodiments propose to search for all the possible frequencies, taking account of the geographical position and altitude of the aircraft. To this end, the method of the disclosed embodiments proposes the parallel processing of the frequencies related to terrains (steps 31 and 32 FIG. 1) and the frequencies related to airspaces (steps 33 and 34 of FIG. 1).

It must be noted however that even if the search for possible frequencies is done in parallel for the frequencies related to terrains and the frequencies related to airspaces, only one communications centre can be detected during a search. Indeed, since two communications centers having a same frequency cannot be close to each other, the comparison with the displayed frequency can give only one and the same result, namely the identifier of the communications centre on the frequency displayed. Consequently, with the method of the disclosed embodiments, although several communications centers have been considered to be possible, certain centers corresponding to terrains and others corresponding to airspaces, the comparison of the frequencies of these different communications centers with the frequency displayed can give only one identifier. In other words, only one of these possible communications centers has a communications frequency identical to the frequency displayed in the aircraft.

The method of the disclosed embodiments is implemented in a system comprising:
 a display unit in which the displayed frequency is recorded,
 a computer to determine the environment of the aircraft and compare the transmission/reception frequencies of the communications centers with the frequency displayed on the display unit, and
 a database to which the computer is connected. This database comprises at least one list of the communications centers with their transmission/reception frequency and their identifier as well as the information relating to the location of the grounds and the boundaries of the airspace sectors. This database can be an extension of the radio-navigation database already existing on board the aircraft or else a database created specifically for the search for the identifier of the communications centre. The information needed for this extension or this creation of the database is information already available on board the aircraft.

The method of the disclosed embodiments can be implemented whenever a new frequency is written to the display unit of the cockpit. It can also be implemented at regular intervals with, possibly, periodic refreshing or real-time refreshing of the identifier displayed on the display unit.

The method of the disclosed embodiments as described can be used not only for displaying the identifier of the communications centre but also to detect an entry error on the part of the pilot during the registering of the frequency on the display unit. Indeed, in the event of such an error, the method of the disclosed embodiments would not find any identifier. An error message can then be displayed on the display unit.

The method of the disclosed embodiments also enables the detection of the fact that the displayed unit is different from the identifier expected by the pilot.

What is claimed is:

1. A method for the determining, on board an aircraft, of an identifier of a communications centre with which an aircraft crew wishes to enter into contact, comprising the following operations:
 the writing, by the crew, of a radio-communications frequency to a display unit of the cockpit of the aircraft,
 the determining of surroundings of the aircraft,
 the determining of frequencies of the communications centers possible in these surroundings, by sorting out those frequencies that are possible from among all the frequencies of the surroundings of the aircraft in order to determine communications centers liable to communicate on these frequencies with the aircraft,
 after the drawing up of a list of communications centers in the aircraft surroundings with their respective frequencies, then the comparing of the frequencies of these possible communications centers with the frequency displayed on the display unit of the cockpit, and
 when the frequency of a communications centre is identical to the displayed frequency, the displaying on the aircraft display unit of the identifier of said communications centre having a frequency identical to the displayed frequency.

2. A method according to claim 1, wherein the determining of the surroundings of the aircraft comprises a determining of the geographical position of the aircraft and/or a determining of the altitude of the aircraft.

3. A method according to claim 2, wherein the determining of the geographical position of the aircraft comprises a determining of a perimeter of transmission/reception of communications around the aircraft.

4. A method according to claim 3, wherein determining communications centers liable to communicate comprises a search for the terrains situated in the determined transmission/reception perimeter around the aircraft.

5. Method according to claim 3, wherein determining communications centers liable to communicate comprises a search for the sectors of the airspace whose boundaries intersect the transmission/reception perimeter determined around the aircraft.

6. Method according to claim 3, wherein the perimeter of transmission/reception of communications around the aircraft is determined as a function of the speed of the aircraft, its direction of flight and/or its altitude.

7. A method according to claim 2, wherein the determining of the geographical position of the aircraft consists of a search for the position of the aircraft relative to boundaries of the sectors of the airspace.

8. A method according to claim 7, wherein determining communications centers liable to communicate comprises searching for the sector of the airspace in which the aircraft is located and/or the sectors of the airspace close to the position of the aircraft.

9. A system on board an aircraft used to determine an identifier of a communications centre with which an aircraft crew must enter into contact, the system comprising:
 a display unit to which a radio-communications frequency is written;
 a database comprising at least one list of the communications centers, their transmission/reception frequencies and their identifier; and
 a computer capable of:
  determining surroundings of the aircraft, determining frequencies of the communications centers possible in these surroundings, by sorting out those frequencies that are possible from among all the frequencies of the surroundings of the aircraft in order to determine communication centers liable to communicate with the aircraft on these frequencies;

drawing up of a list of communications centers in the aircraft surroundings with their respective frequencies;

then comparing the transmission/reception frequencies of the communications centers with the frequency displayed on the display unit;

and when the frequency of a communications centre is identical to the displayed frequency, displaying on the aircraft display unit, the identifier of said communications centre having a frequency identical to the displayed frequency.

10. Aircraft comprising the system according to claim 9.

* * * * *